Figure 1:
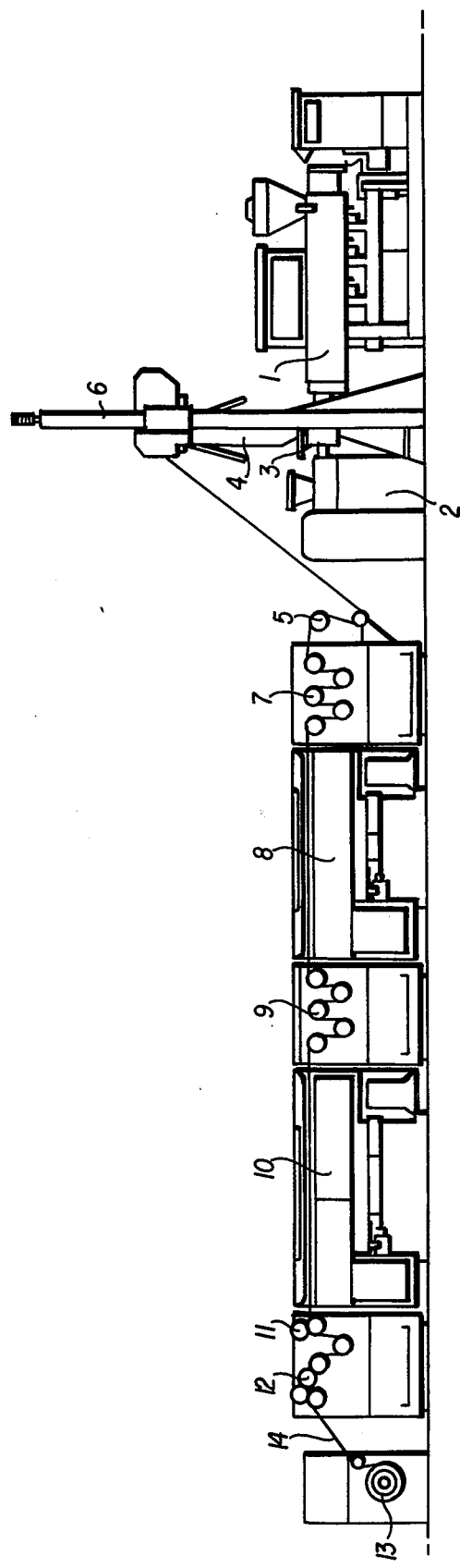

United States Patent [19]

Neveu et al.

[11] 4,102,969

[45] Jul. 25, 1978

[54] METHOD FOR MANUFACTURING CRIMPED TEXTILE ELEMENTS BY FIBRILLATION OF FILMS

[75] Inventors: Jean-Louis Neveu, Lozanne; Gerard Berliet; Angelo Dervissoglou, both of Lyons, all of France

[73] Assignees: Institut Textile de France; Agence Nationale de Valorisation de la Recherche, both of France

[21] Appl. No.: 673,471

[22] Filed: Apr. 5, 1976

[30] Foreign Application Priority Data

Apr. 10, 1975 [FR] France .................. 75 11489

[51] Int. Cl.² .................................... B29H 7/18
[52] U.S. Cl. .................... 264/147; 264/171; 264/210 R; 264/DIG. 47
[58] Field of Search ............ 264/171, 210 R, 147, 264/168, DIG. 47

[56] References Cited

U.S. PATENT DOCUMENTS

| 3,418,200 | 12/1968 | Tanner | 264/171 |
|---|---|---|---|
| 3,460,337 | 8/1969 | Feild | 264/171 |
| 3,488,251 | 1/1970 | Etchells | 264/171 |
| 3,499,822 | 3/1970 | Rasmussen | 264/DIG. 47 |
| 3,548,048 | 12/1970 | Hughes et al. | 264/147 |
| 3,582,418 | 6/1971 | Schuur | 264/147 |
| 3,608,009 | 9/1971 | Changani | 264/147 |
| 3,778,333 | 12/1973 | Rasmussen | 264/171 |
| 3,801,429 | 4/1974 | Schrenk et al. | 264/171 |
| 3,825,644 | 7/1974 | Hosegland et al. | 264/171 |
| 3,882,219 | 5/1975 | Wiley | 264/171 |
| 3,882,259 | 5/1975 | Nohara et al. | 264/171 |
| 3,900,678 | 8/1975 | Hishima et al. | 264/171 |
| 3,968,307 | 7/1976 | Matsui et al. | 264/171 |

FOREIGN PATENT DOCUMENTS

| 46-43,265 | 12/1971 | Japan | 264/DIG. 47 |
|---|---|---|---|
| 1,451,607 | 10/1976 | United Kingdom. | |

*Primary Examiner*—Jay H. Woo
*Attorney, Agent, or Firm*—Stevens, Davis, Miller & Mosher

[57] ABSTRACT

A method for producing crimped textile elements by extruding a bilaminate film each face of which comprises a different thermoplastic macromolecular polymer and one face of which comprises a mixture of such a polymer with a vinyl copolymer, orienting the bilaminate film by stretching, and then fibrillating the oriented film. The fibrillated film may be chopped into discontinuous fibers. The crimped products include fibrillated webs or sheets, continuous filaments and short fibers.

5 Claims, 2 Drawing Figures

U.S. Patent  July 25, 1978  4,102,969

METHOD FOR MANUFACTURING CRIMPED TEXTILE ELEMENTS BY FIBRILLATION OF FILMS

The invention relates to a new process for the production of advantageously heat sealing, crimped, textile elements of improved suitability for dyeing, especially such as fibers, continuous filaments, webs or fleeces, by fibrillation of films of macromolecular thermoplastic materials; it also relates to the products thus obtained.

Fibrillation is a technique which is well known per se and widely practiced for a number of years. Schematically it consists of extruding a macromolecular thermoplastic polymer in the form of a thin film (on the order of a few microns thick), orienting this film, which may have been cut into narrow strips, by mono- or bidirectional stretching, and finally fibrillating this drawn film by mechanical pneumatic or other means in such manner as to divide the film into a fibrillated network which is optionally cut so as to convert the whole into discontinuous fibers. Nevertheless, this technique leads to coarse, not very soft, products; that is their count in the filament remains high (20 dtex or more), so that this technique was essentially developed for the production of ropes, string and underlayers of wall coverings.

A number of techniques have been proposed for refining the filamentary count of these fibrils, to increase their softness and their textile character.

In the British Pat. No. 1,145,982, it has been proposed to superimpose longitudinally two oriented films of different polymers, then to stretch these two films to fibrillate them mechanically and finally to subject the combination obtained to a thermal treatment to reveal the crimp obtained. Due to the weak adhesions of the elementary fibrils at their interface, the fibers obtained are only slightly crimped.

In U.S. Pat. No. 3,608,024, this adhesion at the interface is improved by subjecting the two films to a change of direction preferably at fibrillation. This technique results in nonetheless the same preceding difficulties, that is a crimp which is only slightly pronounced and insufficient to be employed in textiles.

It has been proposed to apply the fibrillation method to so-called bilaminate films, that is to say films wherein the two faces are each made of different polymers which, at equal temperature, have stress-deformation graphs which do not coincide. The polymers may be chemically different, but advantageously, especially in order to increase the mutual affinity of the two layers, chemically identical polymers are utilized wherein, however, the molecular weight for example, the steric configuration, the crystallinity, the crystallization initiation agents and the charges are different. In practice, in this technique which has in particular been described in U.S. Pat. No. 3,582,418, the polymers are polyolefins, especially based on polypropylene. In this manner materials having more pronounced textile character and which are softer as a result of the appearance of crimp (also called undulation) are obtained. Nevertheless, for numerous textile applications, for example knitting, the crimp is still considered insufficient, the filamentary count still too high, the elasticity limited and the handle too different from that of conventional textiles. Finally, in most cases it is necessary to develop the crimp, that is the potential bulk of the yarns obtained from these products by a subsequent thermal treatment produced in flock, on yarn or on fabric.

The present invention mitigates these disadvantages. It relates to an improvement of the technique of bilaminate fibrillation for the production of crimped textile elements wherein there is extruded a film wherein each of the two faces is formed of a different macromolecular thermoplastic polymer, this film is orientated by stretching, the obtained film is next fibrillated or divided into narrow strips and finally, if desired, the thus prepared fibers are cut. This improvement is characterized in that one of the two faces of the film comprises a mixture of at least one macromolecular thermoplastic polymer and at least one vinyl copolymer.

In a preferred embodiment an acidic vinyl terpolymer is utilized as the vinyl copolymer.

The term "acidic vinyl terpolymer" denotes a ternary vinyl copolymer wherein one of the reactive constituents is an organic acid, such that the chemical character of the polymer is acidic. Advantageously, copolymers which are based on vinyl acetate, ethylene and organic acids are utilized.

The macromolecular thermoplastic polymers which form each face of the film should have a satisfactory mutual adherence. This result is achieved by utilizing combinations of polymers which have the closest possible physical or chemical identity, for example combinations of polyamide 6 and 6.6, 6.10 and 11, combinations of polyester of terephthalic acid and polyester of isophthalic acid, combinations of vinyl and vinylidene polychloride, etc. Good results are obtained with polyolefins, especially with combinations of polypropylene and poly(propylene-ethylene) copolymer, which copolymer may be sequenced or in statistical distribution. It is likewise possible to add to one of the constituents a further polymer with a view to imparting specific properties thereto. For example, it is possible to utilize combinations of one phase of polypropylene, or polyamide, especially polyamide 12, and of vinyl copolymer, and a further phase of ethylene-propylene copolymer. As in the conventional bilaminate technique these polymers may have different molecular weights, steric configurations, crystallinities, charges and crystallization initiation agents, from one layer to the other.

Mixing of the vinyl copolymer with one of the polymers is effected in conventional manner, for example by malaxating, grinding, blending, etc. In practice, the two polymers are mixed in the hopper of the extrusion-spinning plasticizer of the layer in question.

When the bilaminate film is formed from a combination of a polymer such as polypropylene and a copolymer based essentially of polypropylene, the vinyl copolymer is preferably added to the simple polymer.

The thickness of the stratified film, that is to say consisting of the two extruded but not stretched polymer layers, is advantageously between about 0.01 and about 1.5 millimeters, and preferably on the order of a few tens of microns. The weight distribution between the two polymer layers may vary within wide limits, depending on the desired properties. Generally, this distribution will be between about 0.1 and about 10, preferably between about 0.2 and about 1.

Advantageously the relative thicknesses of each of the two layers differ and that which contains the vinyl copolymer is the thicker one.

The proportion by weight of the vinyl copolymer relative to the weight of the polymer of the same layer is less than 20% and preferably in the neighborhood of 5%.

As has already been said, one of the two layers may contain a further polymer. Excellent results, especially with respect to improving the tinctorial affinity, have been obtained by adding to the phase which contains the polypropylene and the vinyl copolymer a polyamide, such as the polyamide 12 derived from lauryl lactam, this latter constituent advantageously representing by weight on the order of about 10% of the weight of the polypropylene.

The stratified film is produced either by simultaneous extrusion of the two molten layers of polymer through a single extrusion slit, or, preferably by separate extrusion of the two layers and joining the latter, for example under the action of pressure and while still in tacky condition. Advantageously, the so-called blown extrusion may be employed wherein the film is extruded in tubular form into which air is blown.

The molecular orientation of the two layers is effected by drafting (drawing or pulling), especially by means of drafting (drawing or pulling) sets between which the film is stretched, without however being broken. In practice, with stratified films based on polypropylene it is possible to stretch (elongate) the film on the order of about five to twenty times and sometimes more.

In a known and preferred manner hot-stretching is practiced.

In this stage of the treatment, it is possible to over-stretch or relax the stretched film, especially by hot means.

The fibrillation operation is generally performed at ambient temperature and by any known mechanical, pneumatic or other means. Advantageously mechanical means such as needle rollers may be employed.

After the thus fibrillated sheet has been relaxed or slightly overstretched it is received on a take-up bobbin. Generally, this winding is effected without tension so as to retain the crimp and the textile properties of the fibrillated film. For certain applications, however, such as the use of fibers in paper manufacture or in carding, it may be desirable to wind the sheet under light tension, or to cut it so as to form elementary fibers and then subject the latter to a subsequent thermal treatment which is intended to develop the crimp, especially after conversion into textile or paper articles.

If desired, it is alternatively possible to directly produce a non-woven fabric by receiving the sheet on a fabric forming device.

As has already been said, good results are obtained with bilaminate stratified films based on polypropylene when one of the layers is formed of a copolymer of polypropylene and ethylene having a great preponderance (on the order of about 80% or more) by weight polypropylene, of molecular weight exceeding one hundred thousand (100,000) and of a grade which is adequate for permitting stretching and fibrillation, and when the other layer then consists of a mixture having a low content of vinyl copolymer and optionally polyamide, and a high content of polypropylene which is also of great molecular weight and of a grade which is adequate for permitting stretching and fibrillation; that is, for example, between about 1.5 and about 6 grams per ten minutes, and advantageously between about 2 and about 4 grams per ten minutes, i.e., a polypropylene currently used for the manufacture of weaving strips. In the latter case the vinyl copolymer is advantageously olefin-based, especially ethylene-based. Excellent results are obtained with an acidic terpolymer containing a major proportion of ethylene, between 20 and 30% by weight of vinyl acetate, and a certain, but small, amount of organic acids along the polymer chain. Such products are commercially available and the person skilled in the art can readily select them, depending upon the other components and the desired results. As has already been said, the proportion of vinyl copolymer relative to propylene of this layer is less than about 20% and advantageously on the order of about 5% by weight.

Other copolymers, for example of the ethylene/vinyl acetate kind with added micro-crystalline wax, may also be added together with the vinyl copolymer. In this manner, the heatsealing properties of the obtained fibers are improved by producing, as a function of the resins employed, fibers of multiple melting point and the softening range of which is very wide. Moreover, the elongation at rupture of these fibers, as well as their tensile strength, are also improved. Finally, as has already been said, the addition of polyamide promotes the tinctorial affinity, especially with respect to plasto-soluble dyes with or without carriers.

It is surprising that excellent results are obtained by adding polyamide to the layer of polypropylene to which the vinyl copolymer has already been added, since, as will be seen in the examples, the addition of polyamide to polypropylene tends to impede stretching of the film and prevent crimped fibers from being obtained.

The manner in which the invention can be performed and the advantages derived therefrom will become more apparent from the description and the examples which follow, with reference to the accompanying figures, all of which are given by way of indication but not limitation.

Figure 2:
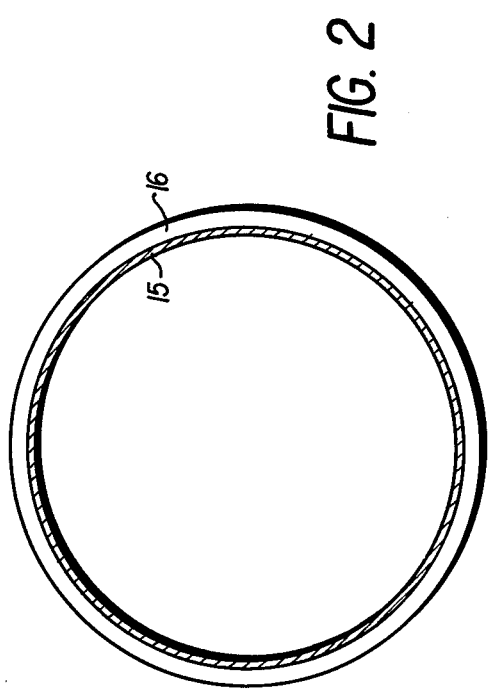

FIG. 1 shows schematically a commercial fibrillation installation which can be used in the invention; and FIG. 2 shows a cross-section of the tubular extruded-stretched but not yet fibrillated film.

The equipment employed in the examples which follow (see FIG. 1) is a commercially available machine which is built and operates in the following manner:

a first screw-type plasticizer 1, type 45 (diameter of screw about 45 millimeters, rate of rotation of the screw about 50 r.p.m., extruded output about 10.1 kilograms/hour);

a second screw-type plasticizer 2, type 30 (diameter of screw about 30 millimeters, rate of rotation of the screw about 60 r.p.m., extruded output about 5 kilograms/hour);

these two plasticizers 1 and 2 feed radially, via two separate passages, molten polymer to the circular spinneret 3;

this spinneret 3 has a mean diameter of about 185 millimeters, the clearance corresponding to the extruder 2 being about 450 microns and that corresponding to the extruder 3 being about 1000 microns;

the film issuing from the spinneret 3 in the form of a hose 4 comprised of two superimposed tubular films is pulled, without substantial stretching-orientation, by pinch rollers, not shown, mounted on the support 6 and rotating at the same speed as the pulling roller 5;

during its travel and upstream of the pulling roller 5 the hose 4 is cooled by the injection of a current of cold air onto its exterior;

a set of driving feed rollers 7;

a stretching oven 8 heated by hot air and about three meters in length;

a set of driving stretching rollers 9, the ratio of speeds between 7 and 9 being controlled in a manner suitable for obtaining the desired stretching ratio;

a stabilizing oven 10, also heated by hot air and of about three meters length;

a set of fixing (setting) rollers 11, synchronized with 9;

a needle-type fibrillator roller 12, model BURCKART;

a system 13 for winding the fibrillated sheet (roving) 14.

The tubular bilaminate stratified film (see FIG. 2) is made up of an inner layer 15 of a polymer delived by the plasticizer 2 and an outer layer 16 of a different polymer delivered by the plasticizer 1 adhering to the first one by physico-chemical action.

EXAMPLE 1

The extrusion assembly of FIG. 1 is fed and adjusted in the following manner:

the plasticizer 1 is supplied with a polymer mixture of, by weight:

95% isotactic polypropylene of high molecular weight, having a grade of four, marketed by Sté Normande de Motiere Plastique under the name PRYLENE GL 0620;

5% acidic terpolymer marketed by Dupont de Nemours under the name ELVAX 4260 based on ethylene and vinyl acetate having an acid number (milligrams of potassium hydroxide per gram of polymer) of about 6 and a grade of about 16.

the plasticizer 2 is supplied with a mixture of, by weight:

97% of a static copolymer polypropylene (92% by weight) — ethylene (8% by weight) having a grade of about 1.3 grams, marketed under the name PRYLENE GR 0156 (the earlier indicated grades are the quantities in grams of a polymer extruded at 230° C for ten minutes under a pressure of about 2.16 kilograms through an orifice of suitable size);

3% by weight of a yellow dye (master mix SNCI reference 12 669 PG).

At the outlet of the spinneret the thickness of the stratified bilaminate film 4 is about 50 microns and the distribution of weights between the two layers 15 and 16 is about one third and two thirds, respectively.

The pulling speed at 5 is adjusted to about seven meters/minute and the speed 7 to about ten meters/minute, the installation operating discontinuously to satisfy this requirement.

The ratio of stretching speeds between 7 and 9 is adjusted to about ten and the temperature of the stretching oven 8 to about 150° C.

The temperature of the stabilization oven 10 is adjusted to about 130° C and the speed of the set of rollers 11 is about 3% slower than that of the set 9 so as to relax the stretched, bilaminate film the thickness of which is about fifteen microns at this stage.

The circumferential rate of rotation of the needle-type fibrillator 12 is adjusted to about five hundred meter/minute.

The sheet 14 is wound up at 13, virtually without any tension.

After the elementary fibrils are cut by a cutting machine equipped with knives into discontinuous fibers, fiber having the following characteristics are obtained:

elongation at rupture: about 6%
breaking strength: about 1.2 grams/dtex
average count: about 10 dtex
average crimp: about 9 waves/centimeter
crimp: helical, three-dimensional By a supplementary thermal treatment the average crimp is increased up to about twelve waves/centimeter.

EXAMPLE 2

Example 1 is repeated with a single modification, i.e., that the speed of the set of rollers 11 is 10% faster than that of the set 9, so that the bilaminate hose is not overstretched.

After fibrillation there is obtained a voluminous roving which requires no supplementary thermal treatment and in which the fibers obtained by severing have the following characteristics:

elongation at rupture: about 5%
breaking strength: about 1.3 grams/dtex
average count: about 10 dtex
average crimp: about 10 waves/centimeter
crimp: helical, three-dimensional By a supplementary thermal treatment the average crimp is increased up to about twelve waves/centimeter.

EXAMPLE 3

Example 1 is repeated with a single modification, i.e., that the fibrillated sheet 14 is wound up at 13 with a slight tension.

This sheet is cut into fiber which have the same characteristics as those of Example 1, except for the crimp which is virtually zero.

These fibers are mixed by carding with other natural or synthetic fibers, and the mixture is converted to yarn which is knitted. By a dry air thermal treatment the crimp of these fibrillated fibers is developed whereby the hand of this knitted material is appreciably improved. This treatment also economically imparts to them a bulky appearance analogous to that which is obtained with "high bulk" spun yarns.

EXAMPLE 4

Example 3 is repeated. The fibrillated sheet which has been obtained is cut into discontinuous fibers of about sixty millimeters in length. These fibers are mixed by carding and then Blamyre fleeced. The fleece obtained is then treated with dry air heated to 130° C for about 30 seconds.

Under the influence of the heat the fibers begin to crimp which augments the volume and the hand of the fleece and increases the entanglement of these fibers, and thus improves the cohesion and the firmness of this fleece.

EXAMPLE 5

Example 1 is repeated by feeding to the plasticizer 1 only isotactic polypropylene (PRYLENE GL 0620), that is by reproducing the essential teaching of U.S. Pat. No. 3,582,418 mentioned above, which, if necessary, is hereby incorporated by reference.

After severing into discontinuous fibers there are obtained fibers having the following characteristics:

elongation at rupture: about 5%
breaking strength: about 1.1 grams/dtex
average count: about 9 dtex
average crimp: about 5 waves/centimeter (after supplementary thermal treatment)

The hand of these fibers compared to that of the fibers obtained according to Examples 1 to 4 is quite unlike textiles, but rather like plastic, without considering that the crimp has to be generally developed by a supplementary thermal treatment. Moreover, like all textile materials based on polyolefins, these fibers have a very poor affinity to dyestuffs. Finally, they are not at all heat-sealing.

EXAMPLE 6

Example 1 is repeated with a single modification. The plasticizer 1 is fed with only acid terpolymer ELVAX 4260.

It is virtually impossible to obtain a film which is industrially recoverable, without taking into account that the film which is obtained is only very slightly fibrillatable since it is poorly stretchable and, on the other hand, greatly clogs the fibrillator 12 and, finally, at best leads to very coarse fibrils having no textile hand at all.

EXAMPLE 7

Example 1 is repeated but this time the plasticizer 1 is fed with a mixture of, by weight:
  about 92% isotactic polypropylene (PRYLENE GL 0620)
  about 5% acidic terpolymer (ELVAX 4260)
  about 3% of an ethylene/vinyl acetate copolymer to which micro-crystalline wax, called HOT MELT SWIFT
  9 M 59, has been added.

Results which are very similar to those obtained in Example 1 are obtained, with an improved hand however.

EXAMPLE 8

Example 1 is repeated by feeding the plasticizer 1 with a mixture of, by weight:
  about 90% isotactic polypropylene (PRYLENE GL 0620)
  about 10% polyamide 12 derived from lauryl lactam marketed by Hüls under the name VESTAMID 23-40.

Irrespective of the stretching conditions (ratio, temperature, relaxation or overstretching) which, in any case, remains an awkward or even difficult operation, the cut fibers obtained are not crimped, either at the exist from the fibrillator 12 or even after a supplementary thermal treatment. Consequently they are unsuitable for most textile or paper manufacturing applications.

Furthermore, these fibers have the following main characteristics:
  elongation at rupture: about 6%
  breaking strength : about 1.1 grams/dtex
  average count: about 10 dtex.

EXAMPLE 9

Example 7 is repeated by adding to the composition fed to the plasticizer 1, about 5% by weight of a vinyl acid terpolymer ELVAX 4260 to the weight of the polypropylene-polyamide composition.

In every case and almost regardless of what the working conditions are, crimped fibers, the hand and feel of which are very clearly textile, are obtained directly downstream of the fibrillator 12. As a function of the working conditions, especially of stretching, it is possible to vary the intensity of crimping and the limit of elastic deformation of the fibers.

Moreover, contrary to what took place in Example 8 the film does not pose any problems with regard to stretching.

Finally, these fibers present a great affinity to dye, especially plasto-soluble dyes, and an increased softening point, which is generally between about 120° and about 170° C. The fibers obtained have the following general characteristics:
  elongation at rupture: about 8.5%
  breaking strength: about 2.5 grams/dtex
  mean count: about 7 dtex
  crimp: about 9/cm (before complementary thermal treatment)

Thus, these fibers are perfectly suitable for textile or paper making applications.

The fibrils and/or the fibers obtained according to the invention have excellent crimp, good color retention, improved dying affinity, and advantageous thermo-sealing properties which permit them to be used with success in a number of applications.

It is already known that vinyl copolymers, notably the acidic terpolymers, improve the color retention and permit the welding of inert products, such as blocks of plastic material. But it is not readily predictable that fibrillation of these known products, according to a particular operational process, permits considerable improvement, and in an unexpected manner, in crimping and bulking achieved by the present invention. The textile characteristics of the fibrillated bilaminate fibers (see comparative examples 1, 5, 8 and 9), when the same elements were used in the same manner, without the vinyl copolymer, led to unsatisfactory results.

The method according to the present invention can be used for the manufacture of all textile elements by fibrillation of bilaminate film. One can transform the narrow film bands, or woven sheets thereof (which thus permit, due to the latent or developed crimp) to obtain either a straw effect, or, after twisting of the sheets upon themselves, a bulked, hairy and elastic yarn.

Generally, one transforms the fibrillated film into discontinuous fibers by cutting or breaking.

The fibers thus obtained have all the advantages of the bilaminate fibers, notably the recovery of the crimp "a posteriori", i.e., good crimp recovery after processing. Moreover, the touch, the bulkiness, the crimp, the finish and the elasticity are improved, such that the textile characteristics of these products are even more marked. Moreover, contrary to the techniques known today, with respect to bilaminates, the thermal recovery treatment is not indispensable, all the more useful to improve the stabilization properties of the fibers. Finally, these fibers are more thermo-fusible. The method is also simple to put into effect, does not necessitate a large investment, is perfectly compatible with existing installations, and is easily integrable in continuous napping and/or calendering.

The applications of the fibers are very numerous, and depend essentially on the characteristics that one wishes to put to profit.

The pronounced crimp of the fibers and/or fibrils when the latter are obtained directly on the machine, permit the use directly of the fibrillated crimped webs not cut in direct napping, and cut fibers in carding and conventional spinning alone or preferably in combination with natural or chemical fibers. When the crimp has been momentarily blocked, for example by winding under tension, one can utilize the fibrillated webs and/or the fibers thus obtained, for the manufacture of non-woven fabrics by the dry process or the wet process, wherein one develops the bulkiness by subsequent thermal treatment.

The thermal adhesive properties of these crimped fibers are advantageous, particularly for the manufacture of nonwoven webs or paper, as well as for making profitable use of textile wastes, without taking into account the use of nonwoven fabrics having improved textile characteristics, to which resistance is given by hot calendering.

What is claimed is:

1. In a process for producing crimped textile elements such as fibers and continuous filaments, by fibrillation of a bicomponent film comprising:

extruding a bilaminate film wherein the first face comprises a copolyolefin polymer based predominantly of polypropylene and the second face another polyolefin polymer different from the first,
    orienting the extruded film by stretching, and
    fibrillating the oriented film;

the improvement wherein the second face comprises a mixture of at least:
    a homopolyolefin polymer,
    an acidic vinyl terpolymer in an amount by weight of less than about 20% of the weight of the mixture, and
    a polyamide in an amount by weight of less than about 10% of the weight of said mixture.

2. A process according to claim 1, wherein said acidic vinyl terpolymer is an interpolymer wherein one of the reactive constituents is an organic acid.

3. A process according to claim 2, wherein said acidic vinyl terpolymer is a copolymer having an ethylene and a vinyl acetate base.

4. A process according to claim 3, wherein in said acidic copolymer having an ethylene base, the vinyl acetate represents by weight between about 20 and about 30% of the total, and said copolymer has a small quantity of organic acid along the polymer chain.

5. A process according to claim 1, wherein the polyamide is derived from lauryl lactam.

* * * * *